Patented May 20, 1952

2,597,406

UNITED STATES PATENT OFFICE 2,597,406

METHOD OF MANUFACTURING OF PHOSPHATE CONTAINING COATING PRODUCTS FOR THE PROTECTION OF METALS AGAINST CORROSION

Ole Thome-Johannesen, Oslo, Norway, assignor to Eivind Eckbo, Oslo, Norway

No Drawing. Application March 8, 1949, Serial No. 80,334. In Norway March 15, 1948

5 Claims. (Cl. 148—6.15)

The present invention relates to a method manufacturing of phosphate containing coating products for the protection of metals against corrosion. The object of the invention is to produce products of this kind capable of being stored for a considerable period without any reduction of quality owing to the fact that the various components of the product react with one another during the storing, and thereby cause undesired changes in the characteristics of the product. The products made according to the method will therefore in use give more reliable and better results than the hitherto known products of this kind.

The employment of phosphate-containing coating-products in the form of a paste as an anti-corrosive underlayer for paint, lac, etc. is known.

It has been found difficult, however, to obtain these products in such a form that they will stand storage for a considerable length of time.

Products of the above mentioned kind consist principally of a phosphate composition, the acid content of which is between mono-phosphate and di-phosphate. As metal components may be used: Mg, Ca, Sr, Ba, Zn, Mn, Fe and others.

Owing to the fact that phosphate with the desired content of acid is not a commercial article it is convenient to mix the mono-phosphate with tri-phosphate or metal-oxide or possibly carbonate. In this way it will be possible to obtain the desired content of metal-components and the desired content of acid.

In the manufacturing of such products the chemical ingredients were finely ground together with the amount of water the paste should have and the product was packed in acid-proof, tight cans. It was found, however, that the acid phosphates of the above mentioned metals decompose in tri-phosphates and free phosphoric acid with the result that the paste hardens in the cans after a relatively short period of storage.

To avoid this drawback the method has been tried of mixing the chemicals in powdery form, but experience shows that in that case the product will have a strong tendency to become granulous. The reason for this is probably that both acid and base are present (usually monobasic calcium phosphate, $CaH_4(PO_4)_2$, and zinc-oxide). When grinding finely to about 300 mesh and subsequent mixing of the ingredients the content of humidity of the air is sufficient to enable the reaction to start and the water produced by the neutralization keeps the reaction going in such a way that after a couple of months large crystals of zinc-phosphate for example, are formed, and the usefulness of the product is diminished even to such an extent that it is practically worthless. Even by mixing mono-phosphate and tri-phosphate a re-crystallization may occur which leads to the same result.

The aim of the present invention is to avoid this drawback and accordingly the invention relates to a method of production which gives a powdery product capable of unlimited storage.

The method, pursuant to the invention, consists in adding to the starting materials, namely mono-phosphate and tri-phosphate, so much water that the reaction between these substances can take place quickly, and after the substances have reacted with each other the water containing product is dried, whereupon the dried product is pulverized. Instead of using a mixture of mono-phosphate and tri-phosphate, it is possible with similar results to use a mixture of mono-phosphate and metal oxide, or metal carbonate, and to allow these ingredients to react with each other.

By this method a perfectly stable product is obtained which will no longer show any undesired reactions during storage.

The use of carbonates instead of oxides is often most convenient, because the carbon-dioxide developed by the reaction makes the product porous and easier to dry.

The method according to the invention will now be illustrated by some examples.

Example 1

62.5 kg. monobasic calcium phosphate, $$CaH_4(PO_4)_2$$

and 10.0 kg. zinc-oxide are mixed in a powdery state in a suitable mixing device, whereupon 20 kg. water is added. After the addition of the water the product has the consistency of a medium thick porridge or gruel which, however, quickly stiffens and the heat of reaction brings the temperature to about 40° C. By using a suitable mixing device this can be kept in operation during the hardening, and lumps as big as hazel nuts are obtained. When the reaction is finished the product is dried in a suitable drier, preferably at a temperature of between 110° and 130° C. whereupon it is pulverized in a hammer-mill or a ball-mill.

The product is found to be capable of storage for an unlimited period of time without any undesirable reactions, lump formations or the like occurring, and the product is placed on the market as a dry product and is mixed with water before being used.

Example 2

40 kg. monobasic calcium phosphate, $CaH_4(PO_4)_2$, and
35 kg. zinc triphosphate are mixed in a powdery state in a suitable mixing device, whereupon 20 kg. water is added. The procedure is thereafter the same as in Example 1.

Example 3

The mixture obtained according to Example 1 is usually firm and hard and dries slowly. To remedy this the zinc-oxide may wholly or in part be replaced by an equivalent quantity of zinc-carbonate. The carbon-dioxide which escapes during the reaction makes the product porous and easier to dry.

62.5 kg. monobasic calcium phosphate, $$CaH_4(PO_4)_2$$

9.0 kg. zinc-oxide and
1.5 kg. zinc-carbonate are mixed in a powdery state in a suitable mixing device, whereupon 20 kg. water is added. The procedure is thereafter the same as in the preceding examples.

It has been found that some oxides of the metal components, for example manganese and iron, react relatively slowly with the phosphoric acid, and it is therefore in such case advisable to add these metals mainly in the form of carbonates, so as to accelerate the reaction and make it complete.

I claim:

1. A method of production of powdery phosphate-containing coating products, said products being capable of storage, for the protection of metals against corrosion, comprising, mixing (1) calcium mono-phosphate $CaH_4(PO_4)_2$, and (2) tri-zinc-phosphate in such proportions that the content of acid in the mixture lies somewhere between mono-phosphate and di-phosphate, adding a sufficient quantity of water to make the reaction between these substances take place quickly, allowing said substances to react with one another, completely drying the moist, completely reacted mixture at elevated temperature of between 110° and 130° C. and pulverizing the dried mixture.

2. A method of production of powdery phosphate-containing coating products, said products being capable of storage, for the protection of metals against corrosion, comprising, mixing calcium mono-phosphate, $CaH_4(PO_4)_2$, with a material selected from the class consisting of tri-zinc-phosphate, a mixture of tri-zinc-phosphate and zinc-oxide and a mixture of zinc-oxide and zinc carbonate in such proportions that the content of acid in the mixture lies somewhere between mono-phosphate and di-phosphate, adding a sufficient quantity of water to make the reaction between these substances take place quickly, allowing said substances to react with one another, completely drying the moist, completely reacted mixture at elevated temperature of between 110° and 130° C. and pulverizing the dried mixture.

3. A method of production of powdery phosphate-containing coating products, said products being capable of storage, for the protection of metals against corrosion, comprising, mixing (1) calcium-mono-phosphate $CaH_4(PO_4)_2$, (2) zinc-oxide and (3) zinc-carbonate in such proportions that the content of acid in the mixture lies somewhere between mono-phosphate and di-phosphate, adding a sufficient quantity of water to make the reaction between these substances take place quickly, allowing said substances to react with one another, completely drying the moist, completely reacted mixture at elevated temperature of between 110° and 130° C., and pulverizing the dried mixture.

4. A method of production of powdery phosphate-containing coating products, said products being capable of storage, for the protection of metals against corrosion, comprising, mixing (1) calcium mono-phosphate $CaH_4(PO_4)_2$, (2) tri-zinc phosphate and (3) zinc-oxide in such proportions that the content of acid in the mixture lies somewhere between mono-phosphate and di-phosphate, adding a sufficient quantity of water to make the reaction between these ingredients take place quickly, allowing said substances to react with another, completely drying the moist, completely reacted mixture at a temperature of between 110° and 130° C. and pulverizing the dried mixture.

5. A method of production of powdery phosphate-containing coating products, said products being capable of storage, for the protection of metals against corrosion, comprising, mixing (1) calcium mono-phosphate $CaH_4(PO_4)_2$, (2) zinc-oxide and (3) zinc-carbonate in such proportions that the content of acid in the mixture lies somewhere between mono-phosphate and di-phosphate, adding a sufficient quantity of water to make the reaction between these ingredients take place quickly, allowing said substances to react with one another, completely drying the moist, completely reacted mixture at a temperature of between 110° and 130° C. and pulverizing the dried mixture.

OLE THOME-JOHANNESEN.

REFERENCES CITED

The following references are of record in the file of this patent:

UNITED STATES PATENTS

| Number | Name | Date |
| --- | --- | --- |
| 1,167,966 | Allen | Jan. 11, 1916 |
| 1,842,085 | Green et al. | Jan. 19, 1932 |

FOREIGN PATENTS

| Number | Country | Date |
| --- | --- | --- |
| 21,671/29 | Australia | Mar. 11, 1930 |
| 337,559 | Italy | Mar. 7, 1936 |
| 602,923 | Germany | Sept. 19, 1934 |